(12) United States Patent
Wang et al.

(10) Patent No.: US 11,515,702 B2
(45) Date of Patent: Nov. 29, 2022

(54) METHODS, SYSTEMS, AND COMPUTER READABLE MEDIA FOR PROTECTING AND CONTROLLING A MICROGRID WITH A DYNAMIC BOUNDARY

(71) Applicant: University of Tennessee Research Foundation, Knoxville, TN (US)

(72) Inventors: Fei Wang, Knoxville, TN (US); Dingrui Li, Knoxville, TN (US); Yilu Liu, Knoxville, TN (US); Yiwei Ma, Knoxville, TN (US); Ishita Ray, Knoxville, TN (US); Leon M. Tolbert, Knoxville, TN (US); He Yin, Knoxville, TN (US); Lin Zhu, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 430 days.

(21) Appl. No.: 16/775,836

(22) Filed: Jan. 29, 2020

(65) Prior Publication Data
US 2020/0350761 A1    Nov. 5, 2020

Related U.S. Application Data

(60) Provisional application No. 62/841,623, filed on May 1, 2019.

(51) Int. Cl.
*H02H 7/26* (2006.01)
*H02J 3/38* (2006.01)
(Continued)

(52) U.S. Cl.
CPC .......... *H02H 7/262* (2013.01); *H02H 1/0007* (2013.01); *H02H 7/28* (2013.01);
(Continued)

(58) Field of Classification Search
CPC .... H02J 3/48; H02J 3/381; H02J 3/388; H02J 3/32; H02J 3/001; H02J 13/00006;
(Continued)

(56) References Cited

FOREIGN PATENT DOCUMENTS

| CN | 106602607 A | * | 4/2017 | .......... H02J 13/0006 |
| CN | 106998076 A | * | 8/2017 | |

(Continued)

OTHER PUBLICATIONS

Ma et al., "Real-time Control and Operation for a Flexible Microgrid with Dynamic Boundary." IEEE, pp. 5158-5163 (2018).

*Primary Examiner* — Kevin J Comber
(74) *Attorney, Agent, or Firm* — Jenkins, Wilson, Taylor & Hunt, P.A.

(57) ABSTRACT

Methods, systems, and computer readable mediums for protecting and controlling a microgrid with a dynamic boundary are disclosed. One method includes detecting a fault in a microgrid that includes a dynamic point-of-common-coupling (PCC), in response to determining that the microgrid is operating in a grid-connected mode, isolating the fault by tripping a microgrid side smart switch and a grid side smart switch that are located immediately adjacent to the fault, initiating the reclosing of the grid side smart switch, and initiating the reclosing for the microgrid side smart switch via resynchronization if the grid side smart switch is successfully reclosed, and in response to determining that the microgrid is operating in an islanded mode, isolating the fault by tripping a microgrid side smart switch that is located immediately adjacent to the fault, and initiating the reclosing of the microgrid side smart switch.

20 Claims, 5 Drawing Sheets

(51) Int. Cl.
*H02H 7/28* (2006.01)
*H02H 1/00* (2006.01)
*H02J 13/00* (2006.01)

(52) U.S. Cl.
CPC .............. *H02J 3/381* (2013.01); *H02J 3/388* (2020.01); *H02J 13/00006* (2020.01)

(58) Field of Classification Search
CPC ............. H02J 13/00004; H02J 13/0004; H02J 2300/40; H02H 1/0007; H02H 7/28; H02H 7/262; H02H 3/093; Y04S 10/12; Y04S 10/14; Y04S 10/20; Y04S 40/12; Y02E 40/70; Y02E 60/00; Y02E 60/7807
USPC .......................................................... 361/68
See application file for complete search history.

(56) References Cited

FOREIGN PATENT DOCUMENTS

| | | | | | |
|---|---|---|---|---|---|
| CN | 108110738 A | * | 6/2018 | ............... | H02H 7/26 |
| KR | 2018087508 A | * | 8/2018 | ............. | G01R 19/02 |

* cited by examiner

METHODS, SYSTEMS, AND COMPUTER READABLE MEDIA FOR PROTECTING AND CONTROLLING A MICROGRID WITH A DYNAMIC BOUNDARY

CROSS-REFERENCE TO RELATED APPLICATIONS

This application claims benefit of U.S. Provisional Patent Application Ser. No. 62/841,623, filed May 1, 2019, which is herein incorporated by reference in its entirety.

STATEMENT OF GOVERNMENT SUPPORT

This invention was made with government support under Contract No. EEC-1041877 awarded by the National Science Foundation and under Contract No. DE-AR0000665 awarded by Advanced Research Program Agency-Energy (ARPA-E) of Department of Energy. The government has certain rights in the invention.

TECHNICAL FIELD

The subject matter described herein relates to electrical power systems and associated microgrid power systems. More particularly, the subject matter described herein relates to methods, systems, and computer readable mediums for protecting and controlling a microgrid with a dynamic boundary.

BACKGROUND

A microgrid is an energy distribution network that typically includes a power system that comprises one or more distributed energy resources (DERs) and loads. A microgrid may operate in concert with a main electric power grid and can also operate independently of the main power grid in a mode known as "islanded." The connection between a microgrid and the main power grid is typically at a single utility interface point, i.e., one Point-of-Common-Coupling (PCC). This single PCC provides an interface between the microgrid and a feeder of the main power grid. Although some configurations may provide multiple main power grid feeders for supplying power to a microgrid, these configurations are typically designed to connect the multiple main power grid feeders to a single alternating current (AC) power bus. Notably, the AC power bus serves as the interface to the microgrid at a single PCC. Although multiple main power grid feeders may be available to provide service to a microgrid, the single PCC with the microgrid may reduce the effectiveness and/or the benefits of the redundancy provided through the multiple feeders. For example, although a microgrid typically only uses one main power grid feeder connection under normal operation conditions, when a fault occurs at the PCC or internal to the microgrid, then those loads between the fault and the PCC may be isolated from other potentially available main power grid feeders and may have to rely solely on one or more DERs within the microgrid. Without the ability to efficiently use the multiple main power grid feeders that may be available, a microgrid may need additional DERs or DERs with higher power/energy capacities to supply energy and may have reduced reliability and increased costs in delivering power.

Microgrids are considered as a promising technology that further improves the reliability and resilience of a primary electrical power grid. A microgrid can not only operate in grid-connected mode to provide ancillary services to the main grid, but also operate autonomously in "islanded" mode to support critical loads if the main grid is not available due to various inclement weather conditions (e.g., hurricanes, floods, heat waves, etc.).

When a microgrid's capacity is small, the microgrid may be configured to only serve a few customers of a traditional utility with a clearly defined PCC or boundary. However, with the increasing integration of DERs, the capacity of a microgrid could be large enough to serve a significant portion of a feeder or even an entire feeder/substation. This type of microgrid can be defined as a partial feeder microgrid or a full feeder/substation microgrid, depending on the microgrid's maximum service area. Due to the smart switches deployed in the power grid system, a feeder can be divided into several load sections. The partial feeder microgrid is then flexible to expand or shrink its boundary by picking up or shedding these load sections according to its available energy resources. In this manner, more loads can be served while subjected to extreme weather events, as compared to the conventional microgrids having fixed boundaries. More importantly, less energy storage capacity is required, since the extra DERs can be utilized by expanding the microgrid boundary in the islanded mode.

One significant challenge associated with microgrid proliferation is the implementation of cost-effective protection solutions. To address issues related to microgrid protection, such as bi-directional flow and low fault current level, many protection schemes have been proposed on top of sophisticated protection, including directional overcurrent protection, distance relay, traveling-wave-based protection, and differential protection. However, these existing or proposed microgrid protection schemes may not meet all the requirements of a partial feeder microgrid with dynamic PCC. Notably, most of the microgrid protection schemes may need to shut down the entire microgrid if a fault occurs in an islanded microgrid with 100% inverter-interfaced DERs.

Thus, there currently exists a need in the art for implementing a protection and control scheme for a microgrid with a dynamic boundary.

SUMMARY

The subject matter described herein includes methods, systems, and computer readable mediums for protecting and controlling a microgrid with a dynamic boundary. One method includes detecting a fault in a microgrid that includes a dynamic point of common coupling (PCC) and, in response to determining that the microgrid is operating in a grid-connected mode, isolating the fault by tripping a microgrid side smart switch and a grid side smart switch that are located immediately adjacent to the fault, wherein each of the microgrid side smart switch and the grid side smart switch is equipped with a directional element that determines the position of the fault, initiating the reclosing of the grid side smart switch, and initiating the reclosing for the microgrid side smart switch via resynchronization if the grid side smart switch is successfully reclosed. The method also includes, in response to determining that the microgrid is operating in an islanded mode, isolating the fault by tripping a microgrid side smart switch that is located immediately adjacent to the fault, wherein each of the microgrid side smart switch is equipped with a directional element that determines the position of the fault, and initiating the reclosing of the microgrid side smart switch.

One system for protecting and controlling a microgrid with a dynamic boundary includes a microgrid central controller (MGCC) and a plurality of smart switches configured for detecting and isolating a fault in a microgrid, wherein the microgrid includes a dynamic point-of-common-coupling (PCC). The system also includes a plurality of protective relays that are configured for, in response to a determination that the microgrid is operating in a grid-connected mode, isolating the fault by tripping a microgrid side smart switch and a grid side smart switch that are located immediately adjacent to the fault, wherein each of the microgrid side smart switch and the grid side smart switch is equipped with a directional element that determines the position of the fault, initiating the reclosing of the grid side smart switch, and initiating the reclosing for the microgrid side smart switch via resynchronization if the grid side smart switch is successfully reclosed. The system is also configured for, in response to a determination that the microgrid is operating in an islanded mode, isolating the fault by tripping a microgrid side smart switch that is located immediately adjacent to the fault, wherein the microgrid side smart switch is equipped with a directional element that determines the position of the fault, and initiating the reclosing of the microgrid side smart switch.

The subject matter described herein may be implemented in hardware, software, firmware, or any combination thereof. As such, the terms "function" "node" or "engine" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

An object of the presently disclosed subject matter having been stated hereinabove, and which is achieved in whole or in part by the presently disclosed subject matter, other objects will become evident as the description proceeds hereinbelow.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
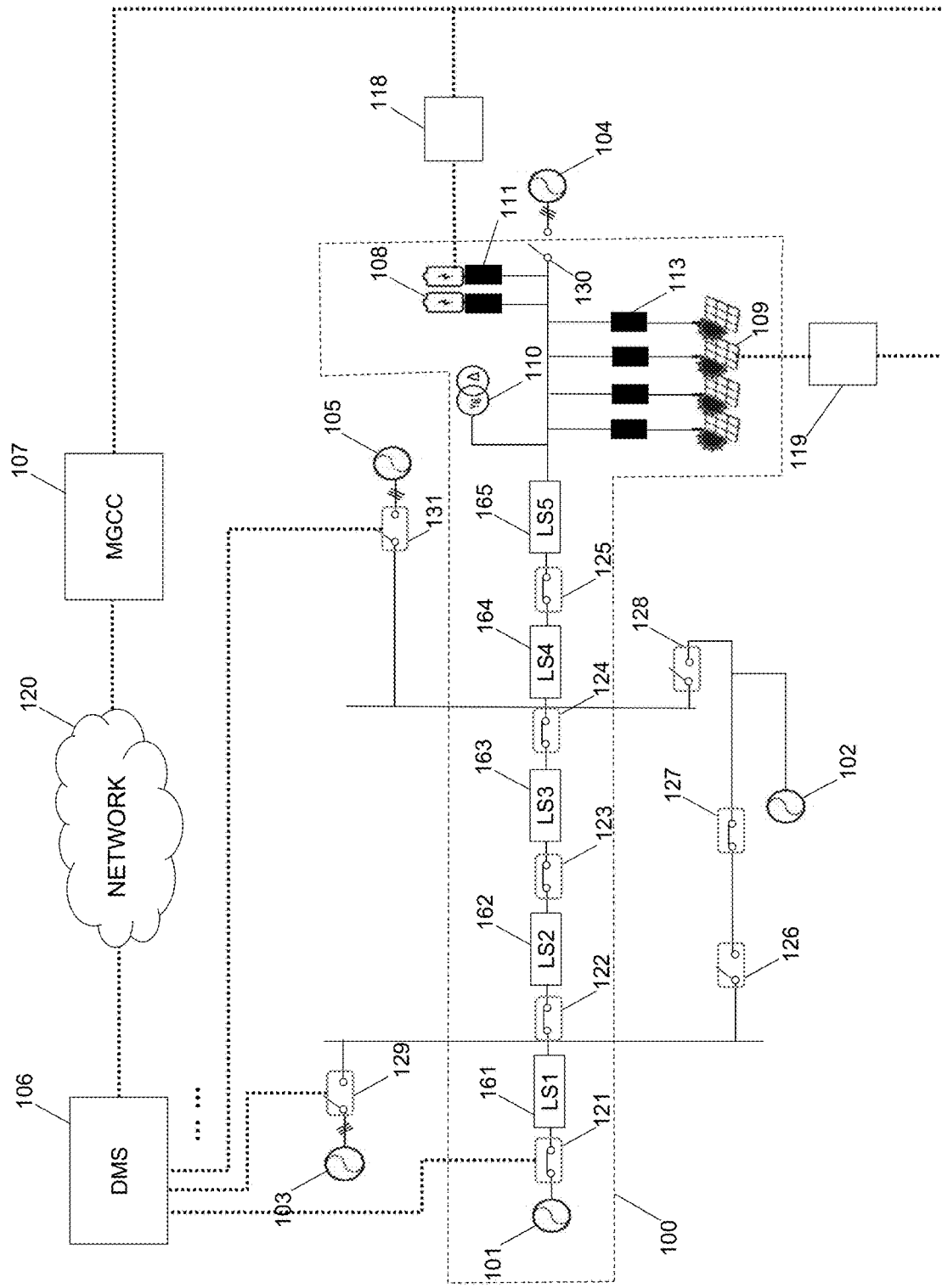
FIG. 1 is a block diagram illustrating an exemplary system for protecting and controlling a microgrid with a dynamic boundary according to an embodiment of the subject matter described herein.

In accordance with some embodiments, the presently disclosed subject matter provides a method for protecting and controlling a microgrid with a dynamic boundary. With the increasing integration of distributed energy resources, microgrids could have adequate capacity to serve a critical portion of a feeder or even the entire feeder, rather than a few specific customer loads. Unlike conventional microgrids with fixed boundary, this type of microgrids can actively expand or shrink its boundary by picking up or shedding load sections, resulting in flexible operation with a dynamic point of common coupling (PCC). This poses new requirements on microgrid protection, e.g., selective protection in the islanded mode, and better integration of microgrid protection, microgrid control, and feeder protection/automation. The present subject matter discloses an enhanced protection scheme on top of existing distribution grid protection. Inverse time overcurrent relays are employed as the grid side relays, while over/under voltage relays coordinated with inverters' ride-through capability are utilized as the microgrid side relays. The enhanced protection scheme is validated on an OPAL-RT real-time simulator, on which a realistic distribution grid and a partial feeder microgrid are emulated. It can detect and isolate the fault within the minimum area (as used herein, "minimum area" refers to the immediately adjacent smart switch(es) that will be opened in order to isolate the fault) rather than shutting down the entire microgrid that is completely (100%) operating with/relying on inverter-interfaced distributed energy resources (DERs) when the microgrid is operating in the islanded mode. More importantly, it can coordinate with microgrid control functions and existing feeder protection/automation functions.

As indicated above, existing microgrid protection schemes may not meet all the requirements of a partial feeder microgrid with a dynamic PCC. For example, most of the microgrid protection schemes need to shut down the entire microgrid that is completely (100%) operating with/relying on inverter-interfaced DERs if a fault occurs in an islanded microgrid. However, in a partial feeder microgrid with dynamic PCC, it is necessary to isolate the fault within the minimum area in the islanded mode to further improve reliability. In other words, selective protection is required to better protect an islanded microgrid. In addition, the deployed smart switches make the selective protection feasible. However, the potential impacts of dynamic PCC on protection have not been fully considered. In fact, since the partial feeder microgrid could serve multiple load sections on the feeder, the flexible operation with dynamic PCC makes it crucial to coordinate microgrid protection and existing feeder automation, like feeder reconfiguration and smart switch reclosing function. Moreover, the microgrid protection needs to coordinate with microgrid control functions, like boundary control. As such, the disclosed subject matter discloses a protection scheme for a partial feeder microgrid with dynamic PCC. In some embodiments, an enhanced and practical protection scheme is implemented overlaid on top of the existing feeder protection.

As used herein, the term "load" refers to any system, device, apparatus, or the like that consumes power.

As used herein a microgrid is an energy or power distribution network that may include one or more distributed energy resources and loads that are capable of operating in concert with or independently of a main power grid.

As used herein a distributed energy resource (DER) is a decentralized power generation source that typically outputs less power than the centralized power stations used in the main power grid to distribute power over large distances, such as coal-fired, gas, and nuclear powered plants. A DER system typically has a capacity of 10 MW or less and is located relatively close to the loads that it serves. A DER system may be part of a microgrid and may be used to provide power to the microgrid loads when the microgrid is connected to the main power grid and also at times when the microgrid is disconnected from the main power grid and operating in islanded mode. DER systems typically use renewable energy resources to generate power including, but not limited to, wind, photovoltaic (PV) (e.g., solar), biomass, biogas, geothermal, and/or hydroelectric.

FIG. 1 is a block diagram illustrating an exemplary system for protecting and controlling a microgrid with a dynamic boundary according to an embodiment of the subject matter described herein. Specifically, FIG. 1 depicts a logical block diagram of a distribution system that includes a partial feeder microgrid comprising of solar PVs 109, a battery energy storage systems (BESS) 108, one grounding transformer 110, and several load sections 161-165 (i.e., LS1 to LS5) divided by a plurality of smart switches 121-131. Smart switches 121-125 are normally-closed smart switches, while smart switches 126-131 are normally-opened smart switches. In some embodiments, load sections 164 and 165 are designated as critical loads (e.g., whose maximum loads are 560 kW and 26 kW, respectively).

The distribution system further includes a distribution management system (DMS) 106 that is configured to monitor and control the generation and distribution of power via the main power grid. DMS 106 may comprise a collection of processors and/or servers operating in various portions of the main power grid to enable operating personnel to monitor and control the main power grid. DMS 106 may further include other monitoring and/or management systems for use in supervising the main power grid, such as a Supervisory Control and Data Acquisition (SCADA) system or any other control system architecture that uses computers, networked data communications, and graphical user interfaces for high-level process supervisory management of the main power grid. DMS 106 may be communicatively connected to each of the smart switches in the distribution system (note that FIG. 1 only shows DMS 106 being communicatively connected to smart switches 121, 129, and 139 for the sake of clarity and example).

In some embodiments, microgrid central controller (MGCC) 107 may be configured to serve as an interface between the DMS 106 and the DER control systems 117-118 along with the power converters 141-142 in the microgrid. Notably, MGCC 107 can be configured to monitor the status of smart switches (e.g., smart switches 121-131) and redefine the main grid side and/or microgrid side (if necessary) after a feeder reconfiguration. For example, MGCC 107 may be configured to facilitate synchronization between the microgrid and the main power grid and to restore frequency and voltage when the microgrid operates in islanded mode. MGCC 107 may be further configured to manage power generation among the DERs 108 and 109 based on, for example, market prices for electricity/power, DER power generation capability, load conditions, and the like. Various parameters in the microgrid may be measured and sent to MGCC 107 over a secure communication network with an acceptable bandwidth including, but not limited to, current, voltage, active and reactive power. These parameters may be measured and provided, for example, with respect to boundary conditions at the microgrid coupling interface locations with feeders 101-105 and used to determine when to disconnect from a first feeder circuit and select a second feeder circuit with which to reconnect. The MGCC 107 may also communicate with the DMS 106 to manage the configuration of smart switches 121-131 to dynamically reconfigure the network topology of the microgrid in response to various types of events. In accordance with various embodiments of the disclosed subject matter, MGCC 107 and/or DMS 106 may set the state (i.e., open or closed) of the various smart switches 121-131 in the power distribution network. Further, MGCC 107 is configured to determine whether the microgrid is operating in a grid-connected mode or an islanded mode, since MGCC 107 is able to gather system-wide information via DMS 106 and the smart switches. By extension, the smart switches are able to determine the microgrid operation mode after communicating with MGCC 107.

MGCC 107 may communicate with DMS 106 over any type of communication network 120. In some embodiments, network 120 may be a secure local area network in the distribution grid control center. In some other embodiments, network 120 may be a global network, such as the Internet or other publicly accessible network. Various elements of the network 120 may be interconnected by a wide area network, a local area network, an Intranet, and/or other private network, which may not be accessible by the general public. Thus, communication network 120 may represent a combination of public and private networks or a virtual private network (VPN). The network 120 may be a wireless network, a wireline network, or may be a combination of both wireless and wireline networks.

In the exemplary embodiment shown in FIG. 1, microgrid 100 is normally connected to a main grid feeder 101. If feeder 101 is not available, the microgrid could be connected to one of the adjacent feeders, i.e., feeder 102 to feeder 105. If none of the five feeders 101-105 are available for any reason (e.g., outage caused by extreme weather events), microgrid 100 will operate in the 'islanded' mode, in which the microgrid can expand or shrink its boundary by acquiring or shedding load sections based on the available power (of the renewable DERs 108-109). For instance, if there is adequate power in the microgrid, load sections 163, 162, and 161 can also be served in addition to the two critical load sections 164 and 165. If there is not adequate power from PVs 109 and BESSs 108, smart switches 101-104 might be turned off. Therefore, only two load sections, load sections 164 and 165, are served. Compared with traditional microgrids with a fixed PCC, partial feeder microgrid 100 could have different PCCs when reconnecting to feeder 101. Namely, the PCC could be smart switch 121, smart switch 122, smart switch 123, smart switch 124, or smart switch 125, depending on the available power in the microgrid. Moreover, microgrid 100 can be reconnected to other adjacent feeders with smart switches 126-131 as the PCC, resulting in flexible operation with dynamic PCC. Although the microgrid with dynamic PCC provides several benefits, the flexible operation associated with the dynamic PCC poses new requirements on microgrid protection. Various protection mechanisms and schemes (and combinations thereof) are described below and/or illustrated in FIG. 2.

Figure 2:
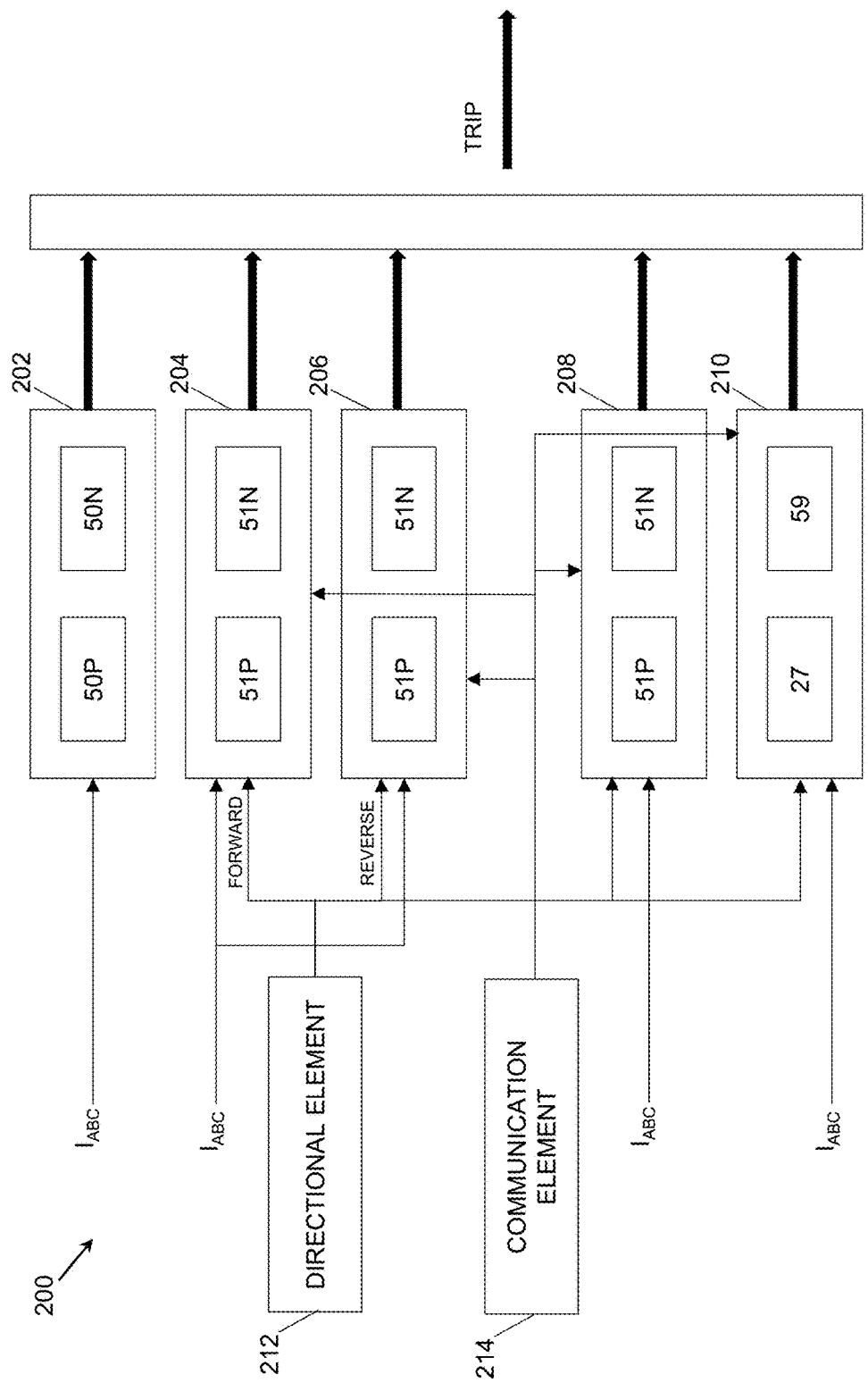
FIG. 2 is an illustration of an exemplary protection scheme facilitated by a smart switch deployed in a partial microgrid according to an embodiment of the subject matter described herein.

FIG. 2 is an illustration of an exemplary protection scheme facilitated by a smart switch deployed in a partial microgrid according to an embodiment of the subject matter described herein. For example, FIG. 2 depicts a number of protection mechanisms for distribution feeders that include exemplary smart switches relay pairs 202-210 included in a smart switch 200. Notably, each of relay pairs 202-210 include various relays that are capable of implementing the distribution microgrid protections. Notably, the corresponding ANSI/IEEE standard device number for each of the relays utilized in FIG. 2 is shown in Table 1 below.

TABLE I

ANSI/IEEE STANDARD DEVICE NUMBER

| Device NO. | Protection |
|---|---|
| 50P | Instantaneous overcurrent relay (phase) |
| 50N | Instantaneous overcurrent relay (ground) |
| 51P | Inverse time overcurrent relay (phase) |
| 51N | Inverse time overcurrent relay (ground) |
| 27 | Undervoltage relay |
| 59 | Overvoltage relay |
| 25 | Synchronization check relay |

Instantaneous overcurrent relays for phase (e.g., 50P relays) and grounding (e.g., 50N relays) faults may be utilized in the disclosed protection mechanism. These two types of relays are used to protect feeders when acquiring (e.g., "picking up") and energizing load sections. Usually, these two relays deployed in a particular smart switch can be coordinated with relays in adjacent smart switches via stage settings in order to open the smart switch closest to a detected fault.

Figure 3:
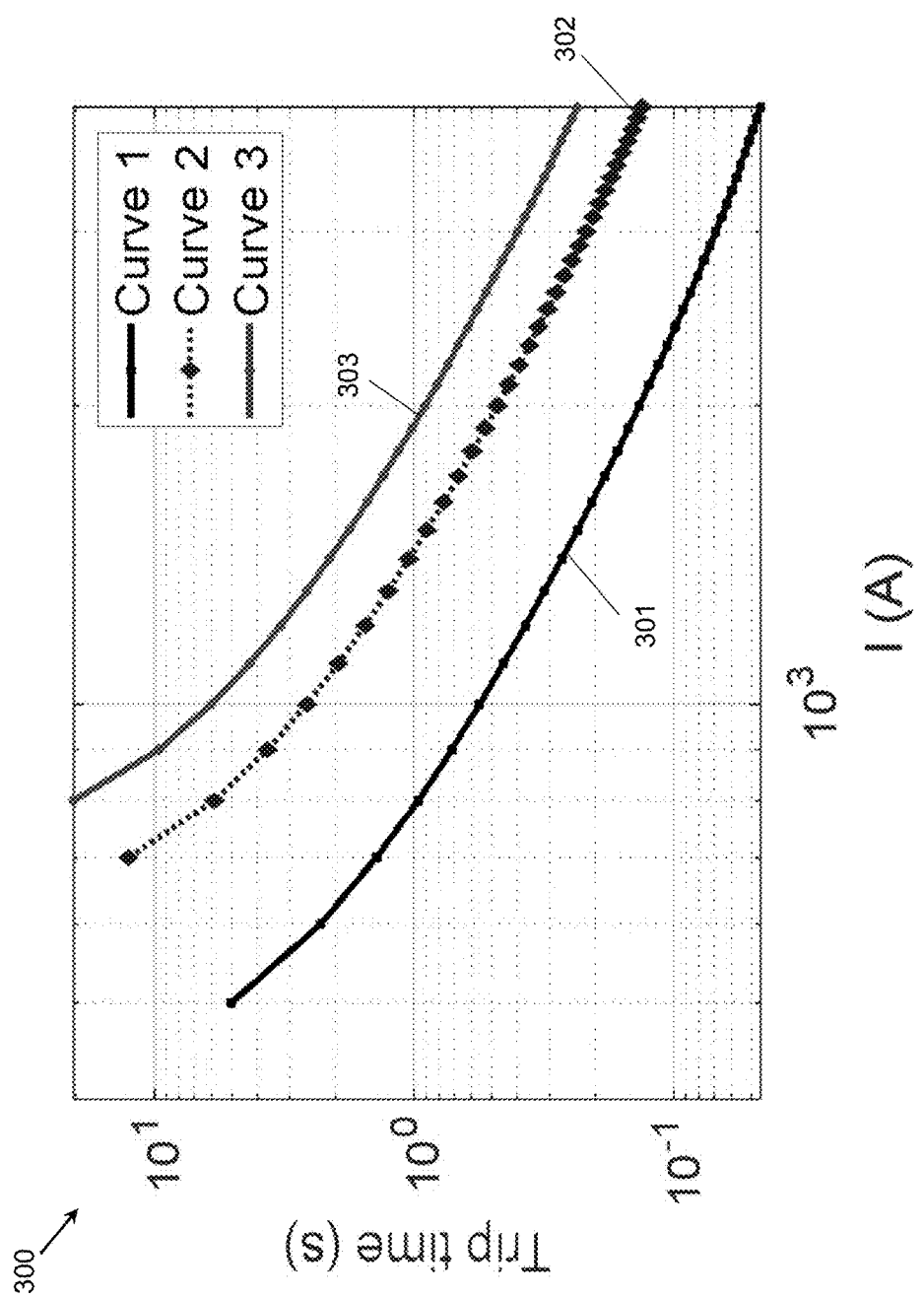
FIG. 3 is an illustration of a graphical representation of inverse time curves for coordination according to an embodiment of the subject matter described herein.

Further, the inverse time overcurrent relays for phase (e.g., 51P relays) and grounding (e.g., 51N relays) faults can also deployed as shown in FIG. 2. The coordination among these relays in different smart switches can be achieved via different inverse time curves or communication. For example, referring back to FIG. 1, a relay in smart switch 121 can be configured with an inverse time curve #3 303 (i.e., a longer trip time), while relays in each of smart switches 122-125 are configured with inverse time curve #2 302 (i.e., shorter trip time). Hence, the relay in smart switch 121 can coordinate with relays in each of smart switches 122-125. Example parameters of the inverse time curves for coordination can be found in graph 300 in FIG. 3 (see e.g., curves 301-303 in FIG. 3).

Returning to the example in FIG. 1, relays included in smart switches 126-131 can also coordinate with other relays via communication. For instance, when a fault occurs in load section 165 (between smart switches 124 and 125), relays in each of smart switches 122-124 are configured to detect the fault. Since the relay in smart switch 124 detects that the fault is on its 'forward' direction (e.g., to right side), that relay will send a delay signal via communication to change the inverse time curves of the relay in smart switch 123 to curve #3 (longer trip time) in order to postpone the trip action of that relay. The signal latency for communication among the smart switches is less than 10 milliseconds (ms), which is fast enough to postpone trip actions. Similarly, the relay in smart switch 123 is configured to send a delay signal via communication to the relay in smart switch 122 to postpone that relay's trip action. Another pair of inverse time overcurrent relays (relay 51P and relay 51N) can be deployed (see relay pair component 206 of exemplary smart switch 200 in FIG. 2) for the 'reverse' direction in order to protect the microgrid feeder when feeder 101 is not available and the load sections are served by one of the adjacent feeders, e.g., when smart switch 121 is open and switch 130 is closed. A directional element 212 in the smart switch is needed to indicate which relay pair (e.g., 51P/51N pair) will be used to make a trip decision. For example, a fault occurring on the right-hand side of smart switches (as oriented in FIG. 1) is defined as a fault in the 'forward' direction, while a fault detected on the left-hand side is defined as a fault in the 'reverse' direction. In addition, a synchronization relay (e.g., a 25 relay which is not shown) may be deployed in exemplary smart switch 200 to check a voltage magnitude difference, an angle difference, and a frequency difference of both sides of the smart switch 200 before reclosing that smart switch. These protections can meet the requirements of feeder operation without a microgrid.

Selective protection mechanisms in an islanded microgrid can also be provided by the disclosed subject matter. As mentioned above, most microgrid protections are unable to isolate the fault within the minimum area in a microgrid that i) is completely (100%) operating with and/or relying on inverter-interfaced DERs and ii) is operating in an islanded mode. Namely, the entire microgrid is typically shut down in the event of a detected fault. Considering the likelihood of a fault occurring in islanded mode (i.e., the low likelihood of the combination of two low probability events), this would be an acceptable solution for microgrids with a fixed PCC, especially for single customer microgrids. However, a partial feeder microgrid that serves multiple load sections is more likely to suffer from a fault due to more overhead line exposure. Notably, the deployment of smart switches in such a microgrid makes it possible to isolate the fault within the minimum area when the microgrid is in the islanded mode. Therefore, selective protection is highly desired in the islanded microgrid to further improve reliability and resilience.

Figure 4:
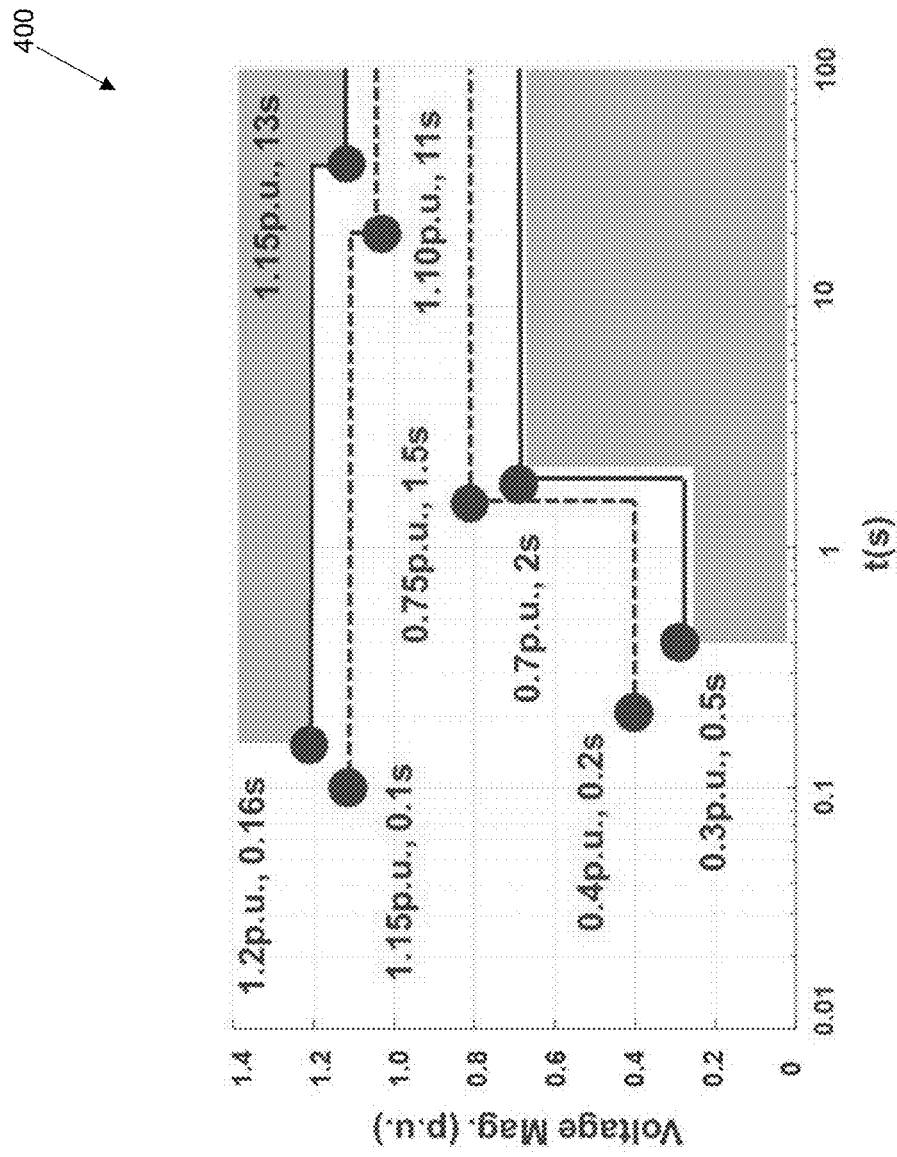
FIG. 4 is an illustration of a graphical representation of under/over voltage protection with coordinated under/over voltage ride-through capability according to an embodiment of the subject matter described herein.

The selective protection requires coordination not only among relays in the microgrid smart switches, but also between smart switches and inverters' ride-through capability. The PV inverters 113 and BESS inverters 111 (as shown in FIG. 1) can be configured with voltage ride-through and frequency ride-through capability (e.g., complying with the IEEE standards). During a fault, ride-through capability may keep inverters 111 and 113 connected to the grid for a short duration and leave enough time for other protections to isolate the fault. Referring to graph 400 in FIG. 4, the solid black lines shows the voltage ride-through capability Category I as an example. The shaded areas in graph 400 represent trip areas. For example, the inverter trips in 0.5 s if the voltage magnitude drops to 0.3 p.u. or below, or in 2 s if the voltage magnitude drops to between 0.7 p.u. and 0.3 p.u. Note that FIG. 4 only illustrates the default settings specified by IEEE standard 1547-2018. These default settings can be adjusted for any practical engineering application.

The disclosed subject matter can be configured to integrate and coordinate microgrid protections and the existing feeder protections together. For example, any given smart switch/relay may be configured to function as a grid side smart switch/relay or a microgrid side smart switch/relay, depending on fault locations and different operating conditions. For instance, when the microgrid is connected to feeder 101 and a fault occurs in load section 164, the relay in smart switch 124 will function as a grid side relay (e.g., which may need to make a trip decision based on the higher fault current). However, when the fault is located in load section 163, the relay in smart switch 124 will function as the microgrid side relay (e.g., be configured to make a trip decision based on much lower fault current and/or other measurements).

The microgrid protection also needs to coordinate with existing feeder automation. When the microgrid is connected (or switched) to different feeders, the main grid and microgrid side may be redefined. For instance, when the microgrid is connected to feeder 101 and a fault occurs in load section 162, the relay in smart switch 122 functions as the grid side relay and the relay in smart switch 123 functions as the microgrid side relay. However, when the microgrid is connected to feeder 104 (and is disconnected from feeder 101) and a fault occurs in load section 162, the relay in smart switch 123 instead operates as the grid side relay.

Another feeder automation function that can be coordinated among the relays of the smart switches is the 'reclosing' function in each smart switch. Typical reclosing logic may dictate that after the smart switch is tripped by a relay, the smart switch will attempt to reclose if i) the voltage on one side is normal/healthy and ii) the voltage on the other side of the smart switch is zero ("0"). When the microgrid is integrated and operating without connections to the main grid feeders, the fault is isolated by tripping smart switches on both sides of the detected fault (e.g., immediately adjacent to the fault). After detecting the fault, the smart switch on the main grid side will attempt to reclose first. If the reclosing is successful, then the relay of the smart switch on the microgrid side can attempt reclose the smart switch via resynchronization.

The disclosed subject matter is further configured to coordinate microgrid protections and microgrid control functions. For example, the MGCC can be configured to coordinate microgrid protection and microgrid boundary control. Notably, the MGCC can conduct microgrid boundary control by switching smart switches on and off in order to balance power generation and consumption in the islanded microgrid. Assuming microgrid 100 in FIG. 1 is connected to feeder 101, when a fault occurs in load section 162, the relays in smart switches 122 and 123 will trip to isolate the detected fault.

Afterwards, if the microgrid has enough power to serve the load sections beyond load section 162 prior to the fault, the microgrid controller needs to curtail PVs 109 and/or charge BESSs 108 to balance the power present within the microgrid. Alternatively, if the microgrid has insufficient power prior to the fault, MGCC 107 could further switch off (i.e., open) smart switch 124 to shed load sections and balance the power inside the microgrid. If the microgrid protection and microgrid boundary control are not well coordinated, MGCC 107 may switch on the previously tripped smart switch to consume extra power inside the microgrid, while the protection will trip the same smart switch again if the fault is determined to be permanent. Notably, this consecutive "reclosing-trip" may continue and ultimately cause the microgrid collapse.

In some embodiments, the requirements on protection of the partial feeder microgrid can be summarized in Table 2 below.

TABLE II

REQUIREMENTS OF PARTIAL FEEDER MICROGRID PROTECTION

| | Requirements | Countermeasures |
|---|---|---|
| 1 | Selective protection in islanded microgrid | Utilize under/over voltage relays<br>Coordinate smart switches via communication<br>Coordinate microgrid protections with inverter's ride-through capability |
| 2 | Coordination with feeder protection and automation | Determine grid or microgrid side relay using directional element<br>Adaptively define grid/microgrid side if microgrid is connected to different feeders<br>Enhance reclosing logic in smart switches |
| 3 | Coordination with microgrid boundary control | Microgrid controller monitors relay action to be aware of fault locations |

Moreover, the countermeasures corresponding to the protection requirements are also indicated in Table 2. In some embodiments, the smart switches) can execute the disclosed protection scheme on top of existing feeder protections and automation functions in order to facilitate the flexible operation of a partial feeder microgrid. In some embodiments, the smart switches can conduct selective protection schemes in an islanded microgrid. On the microgrid side, a current-based relay should not be utilized to protect the islanded microgrid because the fault current is quite low and too close to the normal load current. Usually, it is only 1.2 to 2 times of the rated current due to the current limitation of the inverters (e.g., inverters 111 and 113) utilized in the microgrid. More importantly, the fault current contributed by the microgrid varies depending on the number of energized inverters and their present operating conditions (e.g., under light load vs. heavy load). Nevertheless, because of the current limitation of inverters, the fault detected in the islanded microgrid is usually not that severe. Accordingly, the smart switches can be configured to utilize voltage measurements in order to make a trip decision (e.g., decide to open smart switch). In order to isolate the fault within a minimum area in the islanded microgrid, the smart switches are equipped with over/under voltage relays, which have similar but coordinated voltage ride-through capability with the inverters. This is illustrated in relay pair 210 of exemplary smart switch 200 in FIG. 2. Notably, this configuration allows the smart switches to trip faster than the inverters in the microgrid.

Moreover, the coordination among smart switches can be achieved via communication (as represented by communication element 214). The trip time of the upstream (e.g., backup) relays are delayed by 200 milliseconds. As such, only the relay closest to the detected fault will trip to isolate the fault in the islanded microgrid. The disclosed protection scheme relies on the existing communication capability among smart switches. For communication failure or for utilities that have limited communication capability, default settings can be predefined and/or utilized to protect the microgrid. For instance, the under voltage relay trip time for each of the relays in smart switches 121-125 (shown in FIG. 1) could be respectively preconfigured with trip times equal to 0.1 second (s), 0.1 s, 0.2 s, 0.3 s, and 0.4 s in order to coordinate with the ride-through capability (e.g., 0.5 s) of the inverters (e.g., inverters 111 and 113 in FIG. 1).

As mentioned above and depicted in relay pair 210 of FIG. 2, a undervoltage relay (e.g., a 27 relay) and an overvoltage relay (e.g., a 59 relay) are included in exemplary smart switch 200 to protect the microgrid when the smart switch is on the microgrid side when a fault occurs. The over/under voltage relays may be blocked by a lower fault current in the islanded mode. For example, assuming that the boundary of the islanded microgrid is designated by smart switch 122 when a fault occurs in load section 163, the relays in smart switches 123-125 are able to detect a voltage drop. However, a current increase will be seen by the relays in smart switches 124-125, while a current decrease will be detected by smart switch 123. Therefore, only the relay in smart switch 124 will trip to isolate the fault. Moreover, a relay pair 208 including 51P/51N relays is also included in smart switch 200 in order to trip that smart switch if the switch is positioned on the main grid side. The coordination among the smart switches for the added 51P/51N relays can be achieved via communication in the same way as previously existing relay pairs of 51P/51N relays.

In some embodiments, the smart switch can be configured to coordinate feeder protection. As mentioned above, smart switch 200 can include a directional element 212. Notably, directional element 212 can be used by the smart switch to determine if a detected fault is located on the grid side or on the microgrid side. As described herein, the right-hand (or left-hand) side of a smart switch depicted in FIG. 1 is defined as the forward (or reverse) direction. Since the smart switches may change their roles after feeder reconfiguration, the main grid side and microgrid side may need to be redefined. In some embodiments, MGCC 107 can be configured to monitor the status of smart switches and redefine the grid and microgrid sides (if necessary) after a feeder reconfiguration.

In some embodiments, the definition of grid side relay and microgrid side relay after a feeder reconfiguration is given in Table 3.

TABLE III

DETERMINATION OF GRID OR MICROGRID SIDE RELAY

| Feeder Reconfiguration | R1 F/R | R2 F/R | R3 F/R | R4 F/R | R5 F/R |
|---|---|---|---|---|---|
| Feeder #1 (S0101) | MG/G | MG/G | MG/G | MG/G | MG/G |
| Feeder #2 (S0201) | G/— | G/— | MG/G | MG/G | MG/G |
| Feeder #2 (S0203) | G/— | G/— | G/— | G/— | MG/G |
| Feeder #3 (S0301) | G/— | G/— | MG/G | MG/G | MG/G |
| Feeder #4 (S0401) | G/G | G/G | G/G | G/G | G/G |
| Feeder #5 (S0501) | G/— | G/— | G/— | G/— | MG/G |

F/R: Forward/Reverse direction;
MG/G: Microgrid side relay/Grid side relay

In some embodiments, MGCC 107 can be configured to communicate with the DMS 106 in order to control coordinate microgrid boundaries. For example, when a smart switch is tripped by a relay, the relay and/or smart switch sends a 'delay' signal to MGCC 107. Using these relay trip signals, MGCC 107 becomes aware of the fault location. In response, MGCC 107 can also determine the maximum microgrid boundary, which will be restricted to include non-faulty load sections. Further, when the tripped smart switches successfully reclose, MGCC 107 receives another signal indicating that the fault has been cleared. In response, MGCC 107 can remove the previous limitation on the microgrid boundary.

Figure 5:
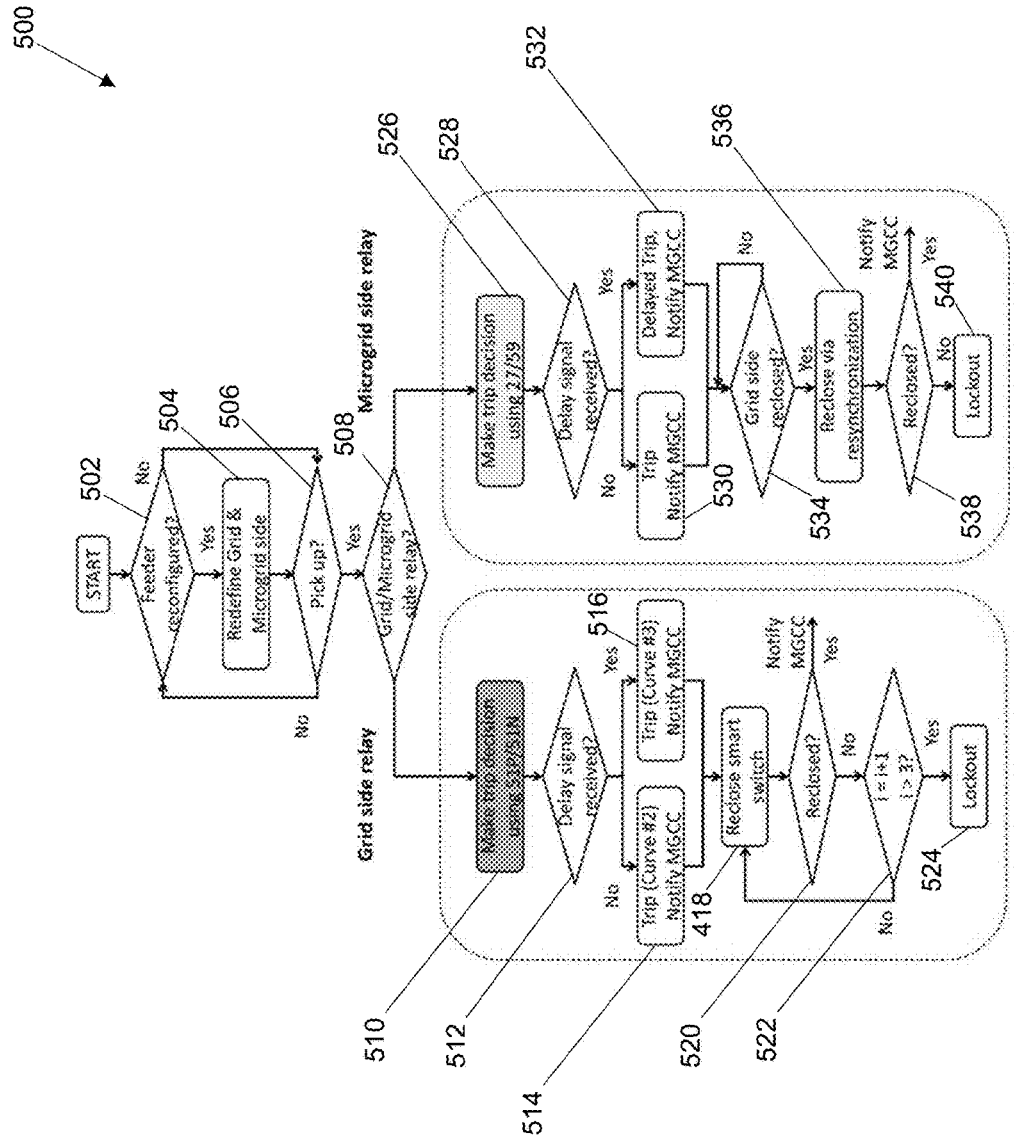
FIG. 5 is an illustration of a flowchart depicting exemplary microgrid protection and control functionality according to an embodiment of the subject matter described herein.

FIG. 5 is an illustration of a flowchart depicting exemplary method 500 for facilitating microgrid protection and coordination functionality according to an embodiment of the subject matter described herein. In some embodiments, method 500 is a process or algorithm that is executed by the MGCC and/or the smart switches in a partial microgrid feeder.

Referring to FIG. 5, block 502 of method 500 determines if the main grid feeder has been reconfigured. If the feeder has been reconfigured, method 500 proceeds to block 504, otherwise method 500 continues to block 506. In block 504, the MGCC redefines the main grid side and the microgrid side in accordance to a detected fault direction. In block 508, method 500 determines if there is one or more additional load sections are picked up. No additional load sections are picked up or added, then method 500 loops back to block 502. If a pickup is conducted, method 500 continues to block 508 where the grid side smart switch and the microgrid side smart switch (which are adjacent to the detected fault) separately operate. For the smart switch on the main grid side, method 500 continues to block 510 where the relay trip decision is made using inverse time overcurrent relays (e.g., 51P relays and 51N relays) included in the smart switch. Method 500 proceeds to block 512 where a determination as to whether the smart switch has received a delay signal. If no delay signal has been received by the smart switch, method 500 continues to block 514 where the smart switch is tripped in accordance to curve #2 (e.g., see FIG. 3). In addition, the smart switch communicates a notification signal or message that indicates its status to the MGCC. In contrast, if a delay signal was received by the smart switch (e.g., from other smart switches), then method 500 continues to block 506 where the smart switch is tripped in accordance to curve #3. In addition, the smart switch communicates a notification message to the MGCC indicating the smart switch status. As shown in FIG. 5, method 500 continues to block 518 where the smart switch attempts to reclose. If the smart switch successfully recloses, then the smart switch sends a notification signal or message to the MGCC. If the smart switch is unable to reclose, then method 500 continues to block 522 and attempts to reclose again. If the number of attempts to reclose exceeds a predefined number, i (e.g., 1=3), then the smart switch will enter a lockout state in block 524. Otherwise, method 500 will loop back to block 518 and attempt to reclose once again.

Returning to block 508, for a smart switch located on the microgrid side, method 500 proceeds to block 526 where the relay trip decision is made using undervoltage and overvoltage relays (e.g., 27 relays and 59 relays). Method 500 continues to block 528 where a determination is made as to whether a delay signal has been received by the smart switch. If a delay signal has not been received by the smart switch, method 500 continues to block 530 where the relay is tripped and a notification message indicating the smart switch's status is sent to the MGCC. If a delay signal was received by the smart switch, then method 500 continues to block 532 where the trip is delayed and a notification message is sent to the MGCC. As shown in FIG. 5, method 500 continues to block 534 where a determination is made as to whether the grid side smart switch has reclosed. If the grid side smart switch has not yet reclosed, method 500 loops back to block 534 (i.e., effectively waiting until the grid side smart switch is closed). If the grid side smart switch has reclosed, method 500 continues to block 536 where the microgrid side smart switch attempts to reclose via resynchronization. If the microgrid side relay is reclosed, a notification message or signal is sent to the MGCC. If the microgrid side relay is not reclosed in block 538, then the smart switch will enter a lockout state in block 540.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a," "an," and "the" refer to "one or more" when used in this application, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

The term "comprising," which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

The embodiments disclosed herein are provided only by way of example and are not to be used in any way to limit the scope of the subject matter disclosed herein. As such, it will be understood that various details of the presently disclosed subject matter may be changed without departing from the scope of the presently disclosed subject matter. The foregoing description is for the purpose of illustration only, and not for the purpose of limitation.

What is claimed is:

1. A method for protecting and controlling a microgrid with a dynamic boundary, the method comprising:
    detecting a fault in a microgrid that includes a dynamic point-of-common-coupling (PCC);
    in response to determining that the microgrid is operating in a grid-connected mode, isolating the fault by tripping a microgrid side smart switch and a grid side smart switch that are located immediately adjacent to the fault, wherein each of the microgrid side smart switch and the grid side smart switch is equipped with a directional element that determines the position of the fault, initiating a reclosing of the grid side smart switch, and initiating the reclosing for a microgrid side smart switch via resynchronization if the grid side smart switch is successfully reclosed; and
    in response to determining that the microgrid is operating in an islanded mode, isolating the fault by tripping a microgrid side smart switch that is located immediately adjacent to the fault, wherein the microgrid side smart switch is equipped with a directional element that determines the position of the fault, and initiating the reclosing of the microgrid side smart switch.

2. The method of claim 1 wherein the smart switches in the microgrid are configured to communicate with each other.

3. The method of claim 1 wherein the microgrid side smart switch determines a trip decision using an undervoltage relay and/or overvoltage relay included in the microgrid side smart switch.

4. The method of claim 1 wherein the grid side smart switch determines a trip decision using an inverse time overcurrent relay included in the grid side smart switch.

5. The method of claim 1 wherein the grid side smart switch sends a notification signal to a microgrid central controller (MGCC) when the grid side smart switch is successfully reclosed.

6. The method of claim 5 wherein the MGCC receives a subsequent notification signal when the fault is cleared.

7. The method of claim 1 wherein the microgrid includes a microgrid central controller (MGCC) that redefines a microgrid side and/or a main grid side after feeder reconfiguration.

8. The method for claim 1 wherein the microgrid includes at least one distributed energy resource (DER) with ride-through capability.

9. A system for protecting and controlling a microgrid with a dynamic boundary, the system comprising:
    a microgrid central controller (MGCC) and smart switches configured for detecting and isolating a fault in a microgrid, wherein the microgrid includes a dynamic point-of-common-coupling (PCC); and
    a plurality of protective relays that are configured for:
        in response to a determination that the microgrid is operating in a grid-connected mode, isolating the fault by tripping a microgrid side smart switch and a grid side smart switch that are located immediately adjacent to the fault, wherein each of the microgrid side smart switch and the grid side smart switch is equipped with a directional element that determines the position of the fault, initiating a reclosing of the grid side smart switch, and initiating a reclosing for the microgrid side smart switch via resynchronization if the grid side smart switch is successfully reclosed; and
        in response to a determination that the microgrid is operating in an islanded mode, isolating the fault by tripping a microgrid side smart switch that is located immediately adjacent to the fault, wherein the microgrid side smart switch is equipped with a directional element that determines the position of the fault, and initiating the reclosing of the microgrid side smart switch.

10. The system of claim 9 wherein the plurality of protective relays are incorporated in a plurality of smart switches that are configured to communicate with each other.

11. The system of claim 9 wherein the microgrid side smart switch determines a trip decision using an undervoltage relay and/or an undervoltage relay included in the microgrid side smart switch.

12. The system of claim 9 wherein the grid side smart switch determines a trip decision using an inverse time overcurrent relay included in the grid side smart switch.

13. The system of claim 9 wherein the grid side smart switch sends a notification signal to the MGCC when the grid side smart switch is successfully reclosed.

14. The system of claim 13 wherein the MGCC receives a subsequent notification signal when the fault is cleared.

15. The system of claim 9 wherein the MGCC redefines a microgrid side and/or a main grid side after feeder reconfiguration.

16. The system of claim 9 wherein the microgrid include at least one distributed energy resource (DER) with ride-through capability.

17. A non-transitory computer readable medium having stored thereon executable instructions that when executed by a processor of a computer controls the computer to perform steps comprising:

detecting a fault in a microgrid that includes a dynamic point-of-common-coupling (PCC);

in response to determining that the microgrid is operating in a grid-connected mode, isolating the fault by tripping a microgrid side smart switch and a grid side smart switch that are located immediately adjacent to the fault, wherein each of the microgrid side smart switch and the grid side smart switch is equipped with a directional element that determines the position of the fault, initiating a reclosing of the grid side smart switch, and initiating a reclosing for the microgrid side smart switch via resynchronization if the grid side smart switch is successfully reclosed; and in response to determining that the microgrid is operating in an islanded mode, isolating the fault by tripping a microgrid side smart switch that is located immediately adjacent to the fault, wherein the microgrid side smart switch is equipped with a directional element that determines the position of the fault, and initiating the reclosing of the microgrid side smart switch.

18. The non-transitory computer readable medium of claim 17 wherein the microgrid side smart switch determines a trip decision using an undervoltage relay and/or overvoltage relay included in the microgrid side smart switch.

19. The non-transitory computer readable medium of claim 17 wherein the grid side smart switch determines a trip decision using an inverse time overcurrent relay included in the grid side smart switch.

20. The non-transitory computer readable medium of claim 17 wherein the microgrid includes a microgrid central controller (MGCC) that redefines a microgrid side and/or a main grid side after feeder reconfiguration.

* * * * *